United States Patent
Imamura

(10) Patent No.: US 11,173,809 B2
(45) Date of Patent: Nov. 16, 2021

(54) ELECTRIC SEAT SLIDE DEVICE

(71) Applicant: TF-METAL Co., Ltd., Kosai (JP)

(72) Inventor: Takashi Imamura, Kosai (JP)

(73) Assignee: TF-METAL CO., LTD., Kosai (JP)

( * ) Notice: Subject to any disclaimer, the term of this patent is extended or adjusted under 35 U.S.C. 154(b) by 24 days.

(21) Appl. No.: 16/680,717

(22) Filed: Nov. 12, 2019

(65) Prior Publication Data

US 2020/0171981 A1    Jun. 4, 2020

(30) Foreign Application Priority Data

Dec. 4, 2018   (JP) .............................. JP2018-226948

(51) Int. Cl.
| | | |
|---|---|---|
| *B60N 2/06* | (2006.01) | |
| *B60N 2/02* | (2006.01) | |
| *B60N 2/07* | (2006.01) | |

(52) U.S. Cl.
CPC ........... *B60N 2/067* (2013.01); *B60N 2/0232* (2013.01); *B60N 2/0705* (2013.01); *B60N 2002/0236* (2013.01)

(58) Field of Classification Search
CPC .... B60N 2/067; B60N 2/0232; B60N 2/0705; B60N 2002/0236; B60N 2/1871; B60N 2/164; B60N 2/165; B60N 2/1655; B60N 2/166; B60N 2/0732; B60N 2/0727
See application file for complete search history.

(56) References Cited

U.S. PATENT DOCUMENTS

| | | | | |
|---|---|---|---|---|
| 9,273,764 | B2* | 3/2016 | Geiges | ..................... F16H 25/08 |
| 9,751,430 | B2* | 9/2017 | Geiges | .................... B60N 2/067 |
| 10,144,310 | B1* | 12/2018 | Ferenc | .................... B60N 2/067 |
| 10,723,244 | B2* | 7/2020 | Couasnon | ............ B60N 2/0732 |
| 2005/0082890 | A1* | 4/2005 | Taubmann | ............. B60N 2/929 |
| | | | | 297/344.1 |
| 2011/0278875 | A1* | 11/2011 | Couasnon | .............. B60N 2/067 |
| | | | | 296/65.13 |
| 2013/0284875 | A1* | 10/2013 | Enokijima | ............. B60N 2/067 |
| | | | | 248/429 |
| 2016/0059740 | A1 | 3/2016 | Shimizu et al. | |

FOREIGN PATENT DOCUMENTS

| | | |
|---|---|---|
| JP | 2013-241174 A | 12/2013 |
| JP | 2016-049804 A | 4/2016 |

* cited by examiner

*Primary Examiner* — Christopher Garft
(74) *Attorney, Agent, or Firm* — Foley & Lardner LLP

(57) ABSTRACT

In an electric seat slide device of the present invention, a rear-side bracket 27 includes a first support member 41 fixed to a lower rail 2, a second support member 42 fixed to the lower rail 2 together with the first support member 41, a female screw member 43 as a first nut member through which a screw shaft 4 passes, and a second nut member 44 through which the screw shaft 4 passes. A pair of side wall portions 47 extending along a lower rail longitudinal direction and a vertical wall portion 62 of the second support member 42 which is formed orthogonal to the straight line along the lower rail longitudinal direction are sandwiched between the female screw member 43 and the second nut member 44.

4 Claims, 6 Drawing Sheets

ELECTRIC SEAT SLIDE DEVICE

BACKGROUND

The present invention relates to an electric seat slide device for a vehicle, and particularly to improvement of a seat slide device configured of a lower rail and an upper rail.

As an electric seat slide device for a vehicle, for example, one disclosed in Japanese Patent Application Publication No. 2013-241174 (hereinafter is referred to as "JP2013-241174") and Japanese Patent Application Publication No. 2016-49804 (hereinafter is referred to as "JP2016-49804") has been known.

The basic structure of the electric seat slide device disclosed in each of JP2013-241174 and JP2016-49804 is one in which an upper rail is slidably attached to a lower rail fixed to the floor of a vehicle.

Specifically, in such a well-known electric seat slide device disclosed in each of JP2013-241174 and JP2016-49804, it includes, in addition to the lower rail and the upper rail, a screw shaft supported on the lower rail and a gear box fixed to the upper rail.

The gear box includes a worm wheel which meshes with the screw shaft, and a worm which meshed with the worm wheel.

In JP2013-241174, the screw shaft is supported at both ends, and both of the end portions of the screw shaft are supported on the lower rail through plate-shaped brackets which are bent in L-shapes.

In JP2016-49804, the front end portion of the screw shaft is supported on the lower rail through a plate-shaped bracket which is bent in an L-shape, and the rear end portion of the screw shaft is supported thereon through a solid block-like bracket.

SUMMARY

However, in the plate-shaped bracket formed by being bent in an L-shape in each of JP2013-241174 and JP2016-49804, there is possibility that sufficient strength and rigidity against a load along the axial direction of the screw shaft cannot be secured. In addition, in the block-like bracket in JP2016-49804, although the sufficient rigidity can be secured if it is formed by, for example, sintering or forging, cost rises.

In the assembling of the electric seat slide device, the screw shaft is inserted into and attached to the gear box and the plate-shaped bracket or the block-like bracket on the lower rail side while being rotated.

Here, it is necessary to finally fix the attached screw shaft so as not to be rotated.

Therefore, in JP2016-49804, the end portion of the screw shaft attached to the block-like bracket is plastically deformed by caulking so as to suppress the rotation of the screw shaft. That is, in JP2016-49804, in order to suppress the rotation of the screw shaft, machining, such as caulking, is required in an assembling process, and manufacturing cost rises.

In addition, JP2013-241174 disclose a structure in which the rotation of the screw shaft is suppressed by the fastening of two nuts. However, as mentioned above, the sufficient rigidity cannot be secured by the plate-shaped bracket.

According to one aspect of the present invention, an electric seat slide device includes: a lower rail disposed on a floor of a vehicle along a longitudinal direction of the vehicle; an upper rail which is attached to the lower rail so as to be slidable along a lower rail longitudinal direction with respect to the lower rail, and to which seat is attached; a screw shaft supported on the lower rail such that both ends of the screw shaft are supported on the lower rail; a gear mechanism provided to the upper rail and having a gear which meshes with the screw shaft; and a support bracket configured to support one end portion of a front end portion and a rear end portion of the screw shaft by using a first nut member and a second nut member through which the screw shaft passes, wherein the bracket includes a first support member fixed to the lower rail and a second support member fixed to the lower rail together with the first support member, wherein the first support member includes a pair of plate-shaped side wall portions facing each other with the screw shaft therebetween along the lower rail longitudinal direction, and a plate-shaped first fixing portion continuing to the pair of the side wall portions and fixed to the lower rail, wherein the second support member includes a plate-shaped second fixing portion fixed to the lower rail together with the first fixing portion, and a plate-shaped vertical wall portion orthogonal to a straight line along the lower rail longitudinal direction, the vertical wall portion which comes in contact with one end surface of each of the pair of the side wall portions of the first support member, and which is provided with a through hole through which the screw shaft passes, wherein the first nut member is disposed so as to face end surfaces positioned more on an other end side of the pair of the side wall portions than the one end surface of each of the pair of the side wall portions, meshes with the screw shaft, and engages with the first support member in a state in which rotation and movement along the lower rail longitudinal direction of the first nut member are regulated, and wherein the second nut member is disposed so as to face the vertical wall portion of the second support member, meshes with the screw shaft, and sandwiches the vertical wall portion and at least a part of each of the pair of the side wall portions between the second nut member and the first nut member.

DETAILED DESCRIPTION

Figure 1:
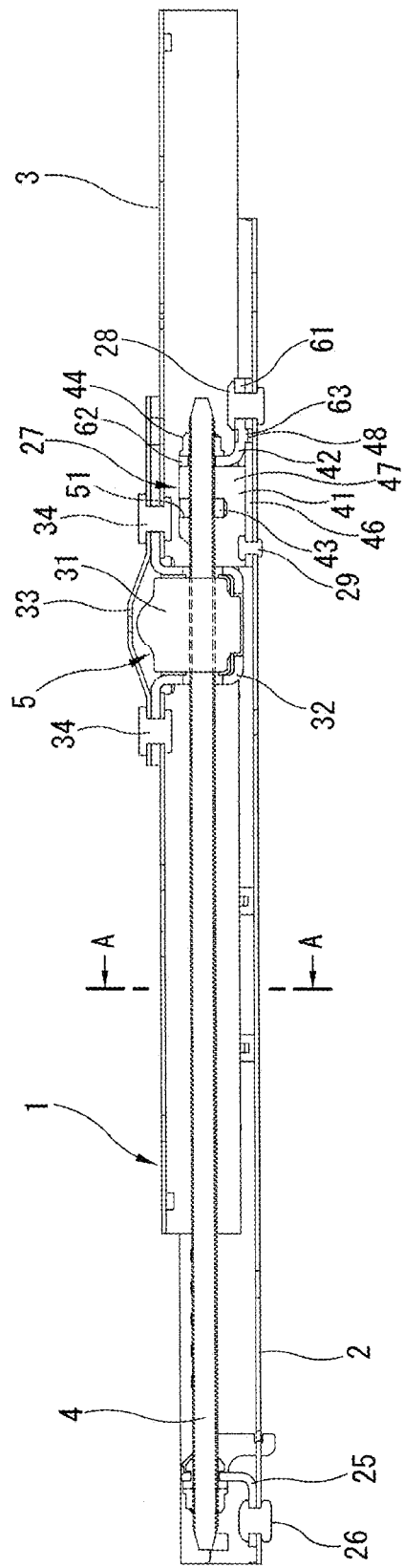
FIG. 1 is a sectional view of an electric seat slide device according to the present invention in a state in which an upper rail is positioned at a retreat limit position.
Figure 2:
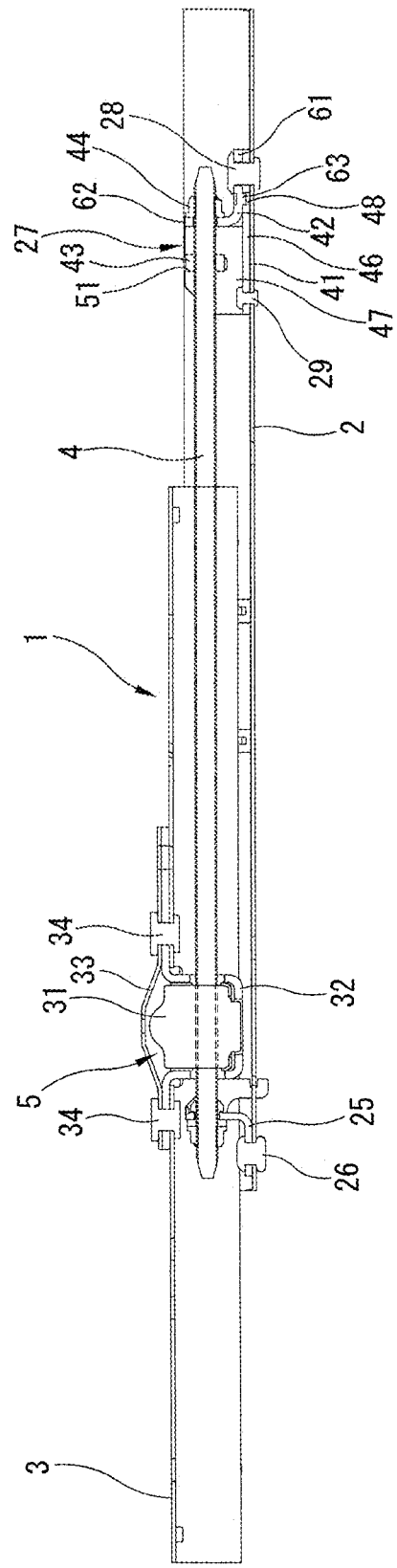
FIG. 2 is a sectional view of the electric seat slide device according to the present invention in a state in which the upper rail is positioned at an advance limit position.
Figure 3:
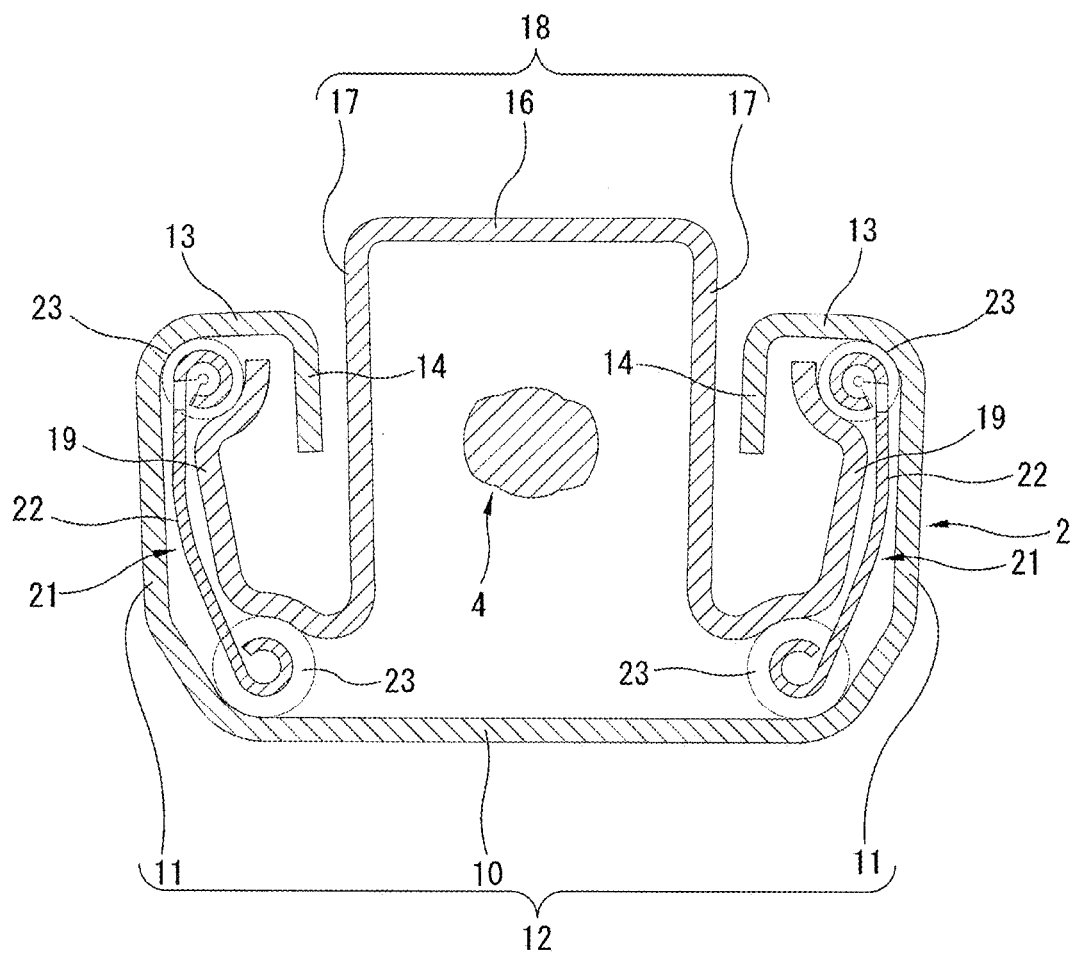
FIG. 3 is a sectional view taken along a line A-A of FIG. 1.
Figure 4:
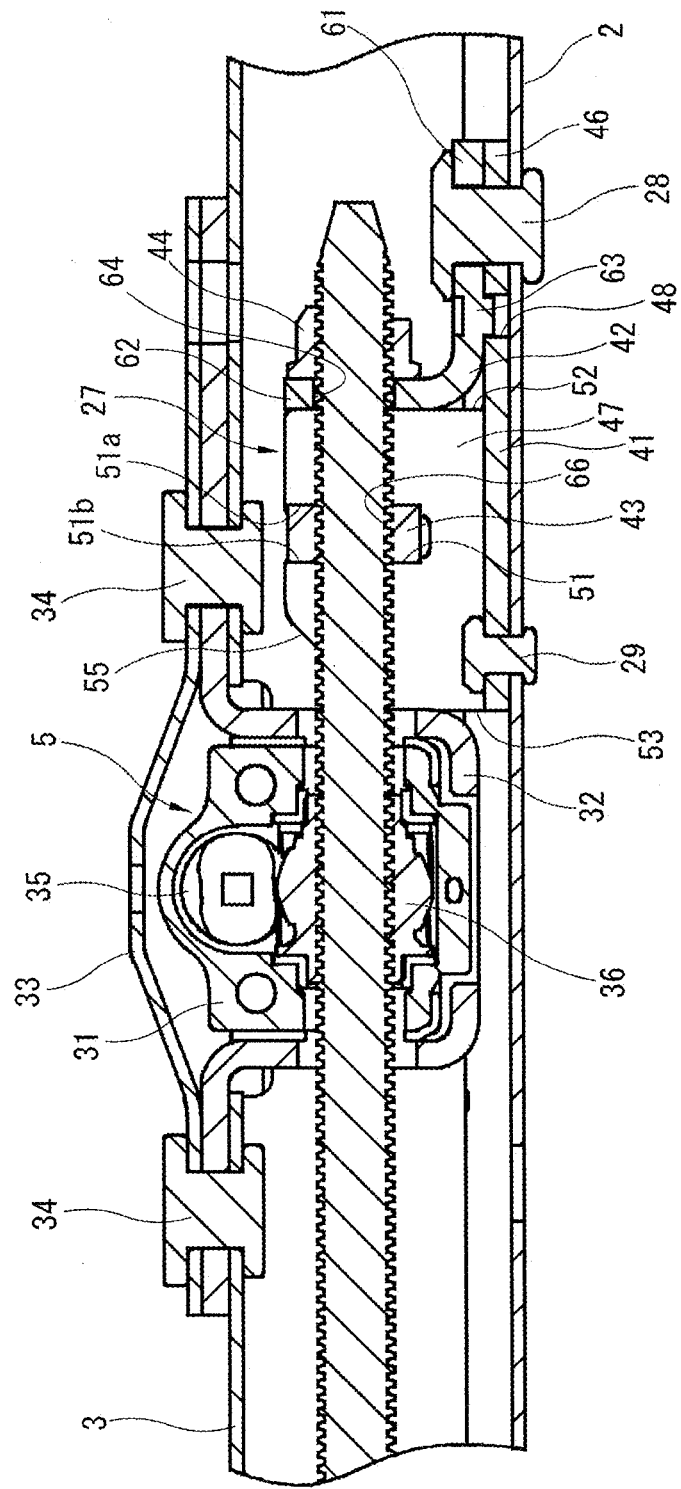
FIG. 4 is an illustrative view showing an enlarged main part in FIG. 1.
Figure 5:
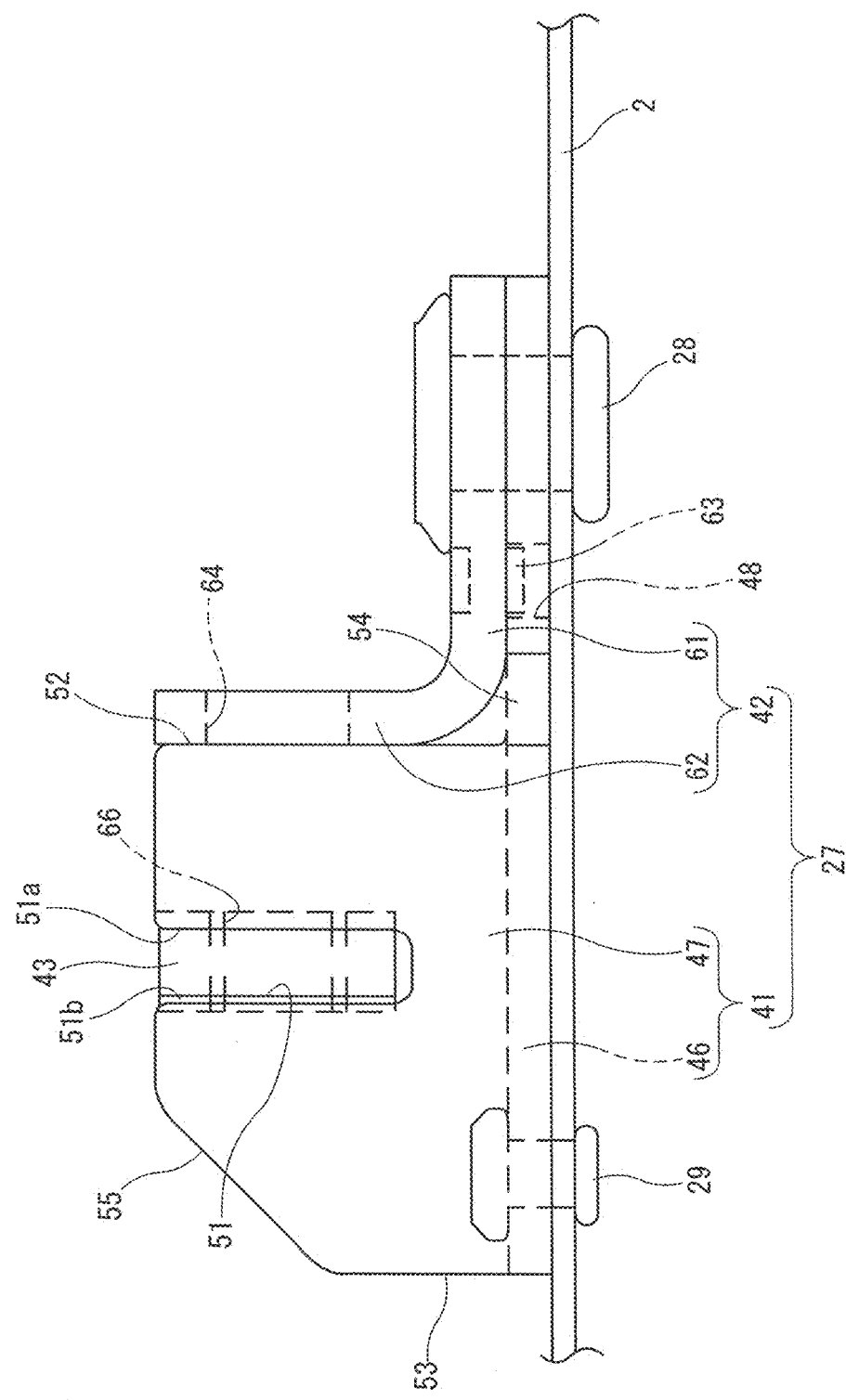
FIG. 5 is a front view showing the details of a rear-side bracket.
Figure 6:
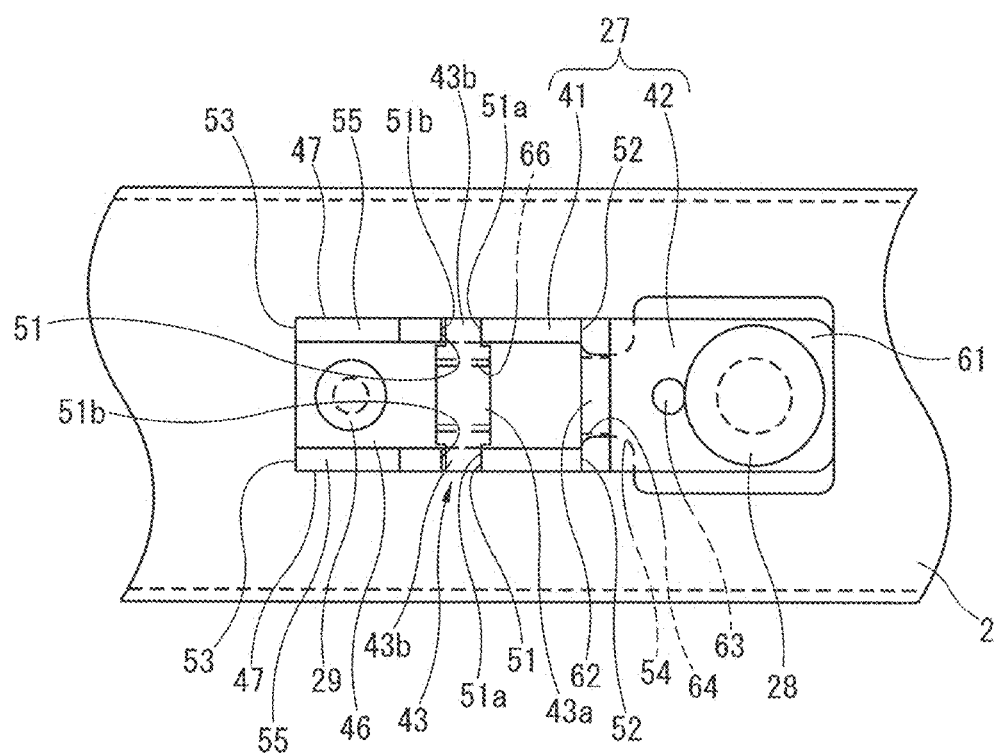
FIG. 6 is a plane view showing the details of the rear-side bracket.

In the following, one embodiment of the present invention will be explained in detail based on the drawings. FIG. 1 is a sectional view of a slide rail 1 along the longitudinal direction that is a main component of an electric seat slide device according to the present invention, and shows a state in which an upper rail 3 is positioned at a retreat limit position with respect to a lower rail 2. FIG. 2 is a sectional view of the slide rail 1 of the electric seat slide device according to the present invention along the longitudinal direction, and shows a state in which the upper rail 3 is positioned at an advance limit position with respect to the lower rail 2. FIG. 3 is a sectional view taken along a line A-A of FIG. 1. FIG. 4 is an illustrative view showing an enlarged main part of FIG. 1. FIG. 5 is a front view showing the details of a rear-side bracket 27 together with the lower rail 2. FIG. 6 is a plane view showing the details of the rear-side bracket 27 together with the lower rail 2.

Here, in the present specification, "vertical direction" is a vertical direction in a state in which the slide rail 1 is fixed to the floor of a vehicle, and is a direction orthogonal to the floor of the vehicle. That is, the vertical direction is the height direction of the vehicle, and corresponds to a vertical direction in each of FIG. 1 to FIG. 5. In addition, in the present specification, "longitudinal direction" is the longitudinal direction of the vehicle to which the slide rail 1 is fixed, and corresponds to a longitudinal direction in each of FIG. 1, FIG. 2 and FIG. 4 to FIG. 6, or corresponds to the direction perpendicular to the surface of the paper of FIG. 3.

In the electric seat slide device called a power seat, a pair of right and left slide rails 1 shown in FIG. 1 to FIG. 3 are disposed on the floor of the vehicle such that the longitudinal direction of each of the slide rails 1 is arranged along the longitudinal direction of the vehicle and the slide rails 1 are arranged parallel to and apart from each other with a predetermined space therebetween. In FIG. 1 and FIG. 2, the left side in each of them is the front side of the vehicle, and the right side in each of them is the rear side of the vehicle.

Each of the slide rails 1 is substantially configured of a lower rail 2 disposed on the floor of the vehicle along the longitudinal direction of the vehicle, an upper rail 3 attached to the lower rail 2 so as to be slidable in the longitudinal direction with respect to the lower rail 2, a screw shaft 4 having a male screw shape which is disposed inside the upper rail 3 along the longitudinal direction thereof, and a gear box 5 as a gear mechanism which is fitted onto the screw shaft 4.

The lower rail 2 is fixed to the floor of the vehicle in such a manner that, for example, the front and rear parts in the longitudinal direction of the lower rail 2 are fixed to the floor of the vehicle through foot brackets (not shown in the drawings).

As shown in FIG. 3, the lower rail 2 includes a lower rail main part 12 which is formed in a U-shape in cross section such that the upper part thereof is opened, and which has a bottom wall 10 fixed to the floor of the vehicle and a pair of outer walls 11 on both of the sides of the bottom wall 10, a pair of upper walls 13 extending inward from the respective distal ends of the outer walls 11, and a pair of inner walls 14 extending from the respective distal ends of the upper walls 13 toward the bottom wall 10. In addition, the distance between the pair of the inner walls 14 facing each other is set such that the upper rail 3 accommodated in the lower rail 2 is slidable.

As shown in FIG. 3, the upper rail 3 includes an upper rail main part 18 which is formed in a U-shape in cross section such that the lower part thereof is opened, and which has a top wall 16 fixed to the back of a seat (not shown in the drawings) and a pair of side walls 17 on both of the sides of the top wall 16, and a pair of bending walls 19 extending upward from the respective distal ends of the side walls 17 while being bent. That is, the seat is attached to the upper rail 3.

The distal ends of the bending walls 19 enter into the respective spaces between the outer walls 11 and the inner walls 14 of the lower rail 2 when the upper rail 3 is attached to the lower rail 2. That is, the distal ends of the bending walls 19 of the upper rail 3 overlap with the respective inner walls 14 of the lower rail 2.

In addition, as shown in FIG. 3, slide guide members 21 are disposed in the respective spaces between the outer walls 11 of the lower rail 2 and the bending walls 19 of the upper rail 3. The slide guide members 21 are disposed to reduce frictional resistance generated at the time when the upper rail 3 slides (moves) inside the lower rail 2. That is, the slide guide members 21 allow the upper rail 3 to slide smoothly with respect to the lower rail 2.

In addition, each of the slide guide members 21 has a well-known structure in which a plurality of steel balls 23 are held on the respective upper and lower parts of a retainer 22, and the illustration thereof is omitted in FIG. 1 and FIG. 2. For example, the slide guide members 21 are interposed at each of front and rear positions in the ranges in which the lower rail 2 overlaps with the upper rail 3 in the longitudinal direction.

The front end portion of the screw shaft 4 is fixed to and supported on a front-side bracket 25 having an L-shape. The front-side bracket 25 is fixed to the front end portion of the lower rail 4 with a rivet 26. In addition, the front-side bracket 25 may be fixed to the front end portion of the lower rail 2 with a bolt, instead of the rivet 26.

The rear end portion of the screw shaft 4 is fixed to and supported on a rear-side bracket 27 as a support bracket. The rear-side bracket 27 is fixed to the rear end portion of the lower rail 2 with rivets 28 and 29. In addition, the rear-side bracket 27 may be fixed to the rear end portion of the lower rail 2 with bolts, instead of the rivets 28 and 29.

With this, the screw shaft 4 is supported at both sides thereof through the front-side bracket 25 and the rear-side bracket 27 in an unrotatable state with respect to the lower rail 2. In addition, the details of the rear-side bracket 27 will be explained later.

As shown in FIG. 4, in the gear box 5, a case 31 corresponding to the box body of the gear box 5 is accommodated in a holder 32.

The holder 32 is fixed to the upper rail 3 with rivets 34 together with a cover 33.

A worm 35 and a worm gear formed of a worm wheel 36 which meshes with the worm 35 are accommodated in the case 31.

The worm 35 is rotated and driven in a normal rotational direction or a reverse rotational direction by an electric motor which is not shown in the drawings. Therefore, when the worm 35 is rotated in the normal rotational direction or the reverse rotational direction by the electric motor, the worm wheel 36 meshing with the worm 35 is rotated.

The inner peripheral surface of the worm wheel 36 is a female screw portion which meshes with the male screw portion of the screw shaft 4. With this, when the worm wheel 36 is rotated with the rotation of the worm 35, the worm wheel 36 moves forward or backward on the screw shaft 4. Consequently, when the worm wheel 36 is rotated, the upper rail 3 fixed with the gear box 5 slides (moves) forward or backward with respect to the lower rail 2. That is, the electric motor is one which is capable of adjusting the position of the seat fixed to the upper rail 3 with respect to the lower rail 2 along the longitudinal direction of the lower rail 2 (longitudinal direction of the vehicle) by rotating a gear (worm 35 and worm wheel 36) of the gear box 5.

As shown in FIG. 4, the rear-side bracket 27 includes a first support member 41 fixed to the lower rail 2, and a second support member 42 fixed to the lower rail 2 together with the first support member 41. The rear-side bracket 27 is configured to support the rear end portion of the screw shaft 4 by using a female screw member 43 as a first nut member through which the screw shaft 4 penetrates, and a second nut member 44 through which the screw shaft 4 penetrates.

As shown in FIG. 4 to FIG. 6, the first support member 41 includes a first fixing portion 46 having a rectangular plate shape which is fixed to the bottom wall 10 of the lower rail 2, and a pair of side wall portions 47 each having a plate shape which are formed to stand upright from both of the respective side ends of the first fixing portion 46. In other words, the first support member 41 includes the pair of the plate-shaped side wall portions 47 facing each other with the screw shaft 4 therebetween along the longitudinal direction, and the rectangular plate-shaped first fixing portion 46 continued with the lower ends of the pair of the side wall portions 47 and fixed to the lower rail 2.

The first support member 41 is formed by bending a flat plate-shaped metal plate having a predetermined thickness, and each part has a plate shape.

The first fixing member 46 is disposed on the bottom wall 10 of the lower rail 2 along the lower rail longitudinal direction along the vehicle longitudinal direction such that one end of the first fixing member 46 is positioned on the rear side of the vehicle and the other end thereof is positioned on the front side of the vehicle. In addition, both of the side ends of the first fixing portion 46 become the ends of the first fixing portion 46 in the width direction of the lower rail 2 perpendicular to the lower rail longitudinal direction.

The first fixing portion 46 includes a positioning hole 48 for the positioning of the second support member 42. The positioning hole 48 is a hole formed so as to penetrate through the first fixing portion 46 by, for example, machining. A positioning projection 63 of the second support member 42 which is mentioned below is inserted into the positioning hole 48.

The first fixing portion 46 is fixed to the bottom wall 10 of the lower rail 2 with the rivets 28 and 29.

The pair of the side wall portions 47 is formed by being bent so as to stand vertically from both of the side ends on the other end side of the first fixing portion 46. That is, the first support member 41 is formed by bending a flat plate having a substantially T-shape.

The pair of the side wall portions 47 is continued in the lower rail longitudinal direction. A slit 51 whose upper side is opened and which has a predetermined width along the lower rail longitudinal direction is formed to each of the side wall portions 47 in the middle position along the longitudinal direction of each of them. In other words, the slit 51 is formed between one end surface 52 on the one end side (rear end side) of each of the side wall portions 47 in the lower rail longitudinal direction and an other end surface 53 on the other end side (front side) of each of the side wall portions 47 in the lower rail longitudinal direction. That is, end surfaces 51a and 51b on both sides in the longitudinal direction of the slit 51 are positioned more on the other end side of the side wall portions 47 in the longitudinal direction than the one end surface 52 of each of the side wall portions 47 in the lower rail longitudinal direction. A female screw member 43 is disposed to the slit 51.

In addition, the other end surface 53 of each of the side wall portions 47 in the lower rail longitudinal direction is formed to be able to abut against (come in contact with) the holder 32 attached to the upper rail 3. That is, the holder 32 services as a stopper part provided to the upper rail 3 which abuts against the other end surface 53 of each of the side wall portions 47. In addition, the other end surface 53 of each of the side wall portions 47 can be used as a so-called stroke regulation stopper (mechanical stopper) for regulating the movement of the upper rail 3 toward the backward direction.

The other end surface 53 of each of the side wall portions 47 is formed to be parallel to the plane surface orthogonal to the straight line along the lower rail longitudinal direction. In addition, the one end surface 52 of each of the side wall portions 47 in the lower rail longitudinal direction is also formed to be parallel to the plane surface orthogonal to the straight line along the lower rail longitudinal direction.

Moreover, the end portion upper end on the other end side of each of the side wall portions 47 is formed to be a slope surface 55 inclined downward toward the front side in a side view.

In addition, reference number 54 in each of FIG. 5 and FIG. 6 indicates a concave portion. This concave portion is formed on both of each of the sides of the first fixing portion 46, and is provided at the position of the one end surface 52 of each of the side wall portions 47 in the lower rail longitudinal direction.

As shown in FIG. 4 to FIG. 6, the second support member 42 includes a second fixing portion 61 having a rectangular plate shape and fixed to the first fixing portion 46 of the first support member 41, and a vertical wall portion 62 having a rectangular plate shape and formed to stand vertically from the second fixing portion 61. In other words, the second support member 42 includes the rectangular plate-shaped second fixing portion 61 fixed to the lower rail 2 together with the first fixing portion 46, and the rectangular plate-shaped vertical wall portion 62 orthogonal to the straight line along the lower rail longitudinal direction. In addition, the second support member 42 is, as a whole, formed to have an L-shape.

The second fixing portion 61 is disposed so as to overlap with the one end side of the first fixing portion 46 of the first support member 41. In other words, one end of the second fixing portion 61 is positioned on the rear side of the vehicle and the other end thereof is positioned on the front side of the vehicle, and the second fixing portion 61 is disposed on the bottom wall 10 of the lower rail 2 along the lower rail longitudinal direction along the vehicle longitudinal direction.

The second fixing portion 61 includes the positioning projection 63 used for positioning the second support member 42. The positioning projection 63 is formed to the second fixing portion 61 by, for example, press processing. This positioning projection 63 is inserted into the positioning hole 48 of the first support member 41 to position the second support member 42.

The second fixing portion 61 is fixed to the bottom wall 10 of the lower rail 2 with the rivet 28 together with the first fixing portion 46 of the first support member 41.

The vertical wall portion 62 is formed by being bent so as to stand vertically from the other end portion of the second fixing portion 61. That is, the second support member 42 is formed by bending a rectangular flat plate-shaped metal plate having a predetermined thickness, and each part has a plate shape. In other words, the second support member 42 is formed by bending a rectangular flat plate-shaped metal plate having a predetermined thickness.

The vertical wall portion 62 is disposed so as to come in contact with the one end surface 52 of each of the pair of the side wall portions 47 of the first support member 41. The vertical wall portion 62 is formed with a circular through hole 64 penetrating therethrough in the plate thickness direction. The through hole 64 is formed such that the screw shaft 4 passes therethrough.

As shown in FIG. 4 to FIG. 6, the female screw member 43 has a rectangular plate shape, and a screw hole 66 through which the screw shaft 4 passes is formed in the middle part of the female screw member 43. A female screw which meshes with the male screw formed on the outer peripheral surface of the screw shaft 4 is formed to the inner peripheral surface of the screw hole 66. That is, the female screw member 43 is one in which the screw hole 66 is formed to a metal plate having, for example, a rectangular shape.

In the female member 43, the thickness of a middle portion 43a through which the screw shaft 4 passes is thicker than that of end portions 43b on both of the sides of the female member 43 which engage with (are caught in) the slits 51. Specifically, the female screw member 43 is formed such that both of the surfaces of the middle portion 43a protrude in the longitudinal direction more than the end portions 43b. That is, the female screw member 43 is formed with steps at continuous parts of the end portions 43b and the middle portion 43a, and both of the surfaces of the female screw member 43 are formed stepwise.

The female screw member 43 is inserted into the slit 51 of each of the side wall portions 47 and the steps on both of the sides are caught in the slits 51, and consequently, the rotation (turn) and the movement of the female screw member 43 along the lower rail longitudinal direction are regulated. That is, each of the slits 51 is a rotation regulating portion for regulating the rotation of the female screw member 43 with respect to the first support member 41, and also is a longitudinal movement regulating portion for regulating the movement of the female screw member 43 long the lower rail longitudinal direction with respect to the first support member 41.

The female screw member 43 is inserted into the slit 51 of each of the side wall portions 47, and is disposed so as to face end surfaces 51a and 51b on both of the sides of the slit 51. These end surfaces 51a and 51b are positioned more on the other end side of the side wall portions 47 than the one end surface 52 of each of the side wall portions 47 in the longitudinal direction. In addition, the female screw member 43 meshes with the screw shaft 4, and engages with (is caught in) the slit 51 in a state in which the rotation and the movement of the female screw member 43 along the lower rail longitudinal direction are regulated. That is, the female screw member 43 meshes with the screw shaft 4, and engages with (is caught in) the first support member 41 in a state in which the rotation and the movement of the female screw member 43 along the lower rail longitudinal direction are regulated.

In addition, if the outer shape of the female screw member 43 has a shape other than a circular shape, the rotation of the female screw member 43 at the time when being inserted into the slit 51 can be regulated. Therefore the outer shape of the female screw member 43 is not limited to a rectangular shape.

The second nut member 44 is a nut made of, for example, metal, and having a locking function, and meshes with the screw shaft 4 in a state of coming in contact with the vertical wall portion 62 of the second support member 42 from the rear side.

In addition, the second nut member 44 is disposed so as to hold the vertical wall portion 62 and a part of the side wall portions 47 more on the rear side than and the slit 51 between the second nut member 44 and the female screw member 43 along the lower rail longitudinal direction. In other words, the second nut member 44 is disposed so as to hold the vertical wall portion 62 and at least a part of each of the side wall portions 47 between the second nut member 44 and the female screw member 43 along the lower rail longitudinal direction.

In the electric seat slide device configured in such a way, since the pair of the side wall portions 47 extending along the lower rail longitudinal direction and the vertical wall portion 62 of the second support member 42 which is disposed orthogonal to the straight line along the lower rail longitudinal direction are sandwiched between the female screw member 43 as a first nut member and the second nut member 44, strength and rigidity against a load along the lower rail longitudinal direction can be improved.

In addition, since the rear-side bracket 27 as a support bracket is one in which the first support member 41 and the second support member 42 whose each part has a plate shape are combined, as compared with a case where the end portion of the screw shaft 4 is supported by a solid block-like bracket, component costs can be reduced.

In the electric seat slide device of the embodiment, the other end surface 53 of the first support member 41 can be used as a stroke regulation stopper (mechanical stopper) for regulating the movement of the upper rail 3 toward the backward direction, and thereby the number of parts and component costs can be reduced.

In addition, in the electric seat slide device, by changing the length of the pair of the side wall portions 47 of the first support member 41 along the longitudinal direction, the stroke characteristic of the upper rail 3 with respect to the lower rail 2 can be easily changed according to a specification.

In the electric seat slide device, since each of the pair of the side wall portions 47 includes the slope surface 55, it is possible to suppress the function of the slide rail 1 from being obstructed due to falling of an foreign matter (for example, a lighter) onto the screw shaft 4.

Specifically, in the slide rail 1, there is possibility that if a foreign matter (for example, a lighter) falls onto the screw shaft 4 more on the rear side than the upper rail 3, the foreign matter is pushed at the time of sliding of the upper rail 3 toward the backward direction, and then is caught between the upper rail 3 and the rear-side bracket 27. However, in the electric seat slide device of the above embodiment, when the upper rail 3 slides toward the retreat limit position, the foreign matter on the screw shaft 4 runs on the slope surface 55 of each of the pair of the side wall portions 47, and then falls onto the floor of the vehicle.

In addition, the slide rail 1 may be configured in such a manner that the front end portion of the screw shaft 4 is fixed to and supported on a bracket having the same structure as the above-mentioned rear-side bracket 27, and the rear end portion of the screw shaft 4 is fixed to and supported on a bracket having the same structure as the above-mentioned front-side bracket 25.

Moreover, the slide rail 1 may be configured in such a manner that both of the front end portion and the rear end portion of the screw shaft 4 are fixed to and supported on respective brackets each having the same structure as the above-mentioned rear-side bracket 27.

In the electric seat slide device of the above embodiment, although the female screw member 43 as a first nut member is held by the slit 51 of each of the side wall portions 47 of the first support member 41, for example, the slit 51 is omitted, and the female screw member 43 may engage with (be caught in) the other end surface 53 of each of the side wall portions 47. In this case, the female screw member 43 is disposed so as to face the other end surface 53 of each of the pair of the side wall portions 47 in the longitudinal direction. Then, the female screw member 43 meshes with the screw shaft 4, and engages with (is caught in) the first support member 41 in a state in which the rotation and the movement along the lower rail longitudinal direction are regulated.

In this way, in the electric seat slide device, even if the female screw member 43 is disposed so as to face the other end surface 53 of each of the pair of the side wall portions 47 in the longitudinal direction, the pair of the side wall portions 47 of the first support member 41 and the vertical wall portion 62 of the second support member 42 can be sandwiched between the female screw member 43 and the second nut member 44, and thereby strength and rigidity against a load along the lower rail longitudinal direction can be improved.

In addition, the first nut member may be a nut having a locking function, or may be formed of two members of the above-mentioned female screw member 43 and a nut having a locking function.

The second nut member 44 may be a nut having no locking function.

In the electric seat slide device of the above-mentioned embodiment, although the first support member 41 and the second support member 42 are separately formed by parts different from each other, the first support member 41 and the second support member 42 may be formed as an integrated member. Specifically, the electric seat slide device may have a configuration in which, for example, the first fixing portion 46 of the first support member 41 and the second fixing portion 61 of the second support member 42 are formed to be continued with each other, and the connection part between the first support member 46 and the second fixing portion 61 is bent so as to form a support bracket (rear-side bracket 27) by bending a single plate-shaped member.

The following summarizes features of the present embodiment.

An electric seat slide device of the present invention includes: a lower rail (2) disposed on a floor of a vehicle along a longitudinal direction of the vehicle; an upper rail (3) which is attached to the lower rail (2) so as to be slidable along a lower rail longitudinal direction with respect to the lower rail (2), and to which seat is attached; a screw shaft (4) supported on the lower rail (2) such that both ends of the screw shaft (4) are supported on the lower rail (2); a gear mechanism (5) provided to the upper rail (3) and having a gear which meshes with the screw shaft (4); and a support bracket (27) configured to support one end portion of a front end portion and a rear end portion of the screw shaft (4) by using a first nut member (43) and a second nut member (44) through which the screw shaft (4) passes, wherein the bracket (27) includes a first support member (41) fixed to the lower rail (2) and a second support member (42) fixed to the lower rail (2) together with the first support member (41), wherein the first support member (41) includes a pair of plate-shaped side wall portions (47) facing each other with the screw shaft (4) therebetween along the lower rail longitudinal direction, and a plate-shaped first fixing portion (46) continuing to the pair of the side wall portions (47) and fixed to the lower rail (2), wherein the second support member (42) includes a plate-shaped second fixing portion (61) fixed to the lower rail (2) together with the first fixing portion (46), and a plate-shaped vertical wall portion (62) orthogonal to a straight line along the lower rail longitudinal direction, the vertical wall portion (62) which comes in contact with one end surface (52) of each of the pair of the side wall portions (47) of the first support member (41), and which is provided with a through hole (64) through which the screw shaft (4) passes, wherein the first nut member (43) is disposed so as to face end surfaces (51a, 51b) positioned more on an other end side of the pair of the side wall portions (47) than the one end surface (52) of each of the pair of the side wall portions (47), meshes with the screw shaft (4), and engages with the first support member (41) in a state in which rotation and movement along the lower rail longitudinal direction of the first nut member (43) are regulated, and wherein the second nut member (44) is disposed so as to face the vertical wall portion (62) of the second support member (42), meshes with the screw shaft (4), and sandwiches the vertical wall portion (62) and at least a part of each of the pair of the side wall portions (47) between the second nut member (44) and the first nut member (43).

Each of the pair of the side wall portions (47) of the first support member (41) includes a slit (51) whose upper side is opened in a middle part along the lower rail longitudinal direction of each of the side wall portions (47), the first nut member (43) is held by the slit (51), and an other end surface (53) in the lower rail longitudinal direction of each of the pair of the side wall portions (47) of the first support member (41) is formed such that a stopper part (32) provided to the upper rail (3) can abut against the other end surface (53).

The first nut member (43) is disposed so as to face an other end surface (53) in the lower rail longitudinal direction of each of the pair of the side wall portions (47) of the first support member (41).

In the support bracket (27), the first fixing portion (46) and the second fixing portion (61) are continued with each other, and the first support member (41) and the second support member (42) are formed integrally with each other.

The entire contents of Japanese Patent Application 2018-226948 filed Dec. 4, 2018 are incorporated herein by reference.

Although the invention has been described above by reference to certain embodiments of the invention, the invention is not limited to the embodiments described above. Modifications and variation of the embodiments described above will occur to those skilled in the art in light of the above teachings. The scope of the invention is defined with reference to the following claims.

The invention claimed is:

1. An electric seat slide device comprising:
   a lower rail disposed on a floor of a vehicle along a longitudinal direction of the vehicle;
   an upper rail which is attached to the lower rail so as to be slidable along a lower rail longitudinal direction with respect to the lower rail, and to which a seat is attached;
   a screw shaft supported on the lower rail such that both ends of the screw shaft are supported on the lower rail;
   a gear mechanism provided to the upper rail and having a gear which meshes with the screw shaft; and
   a pair of support brackets configured to support a front end portion and a rear end portion of the screw shaft,
   wherein at least one of the support brackets supports the front end portion or the rear end portion of the screw shaft to the lower rail by using a first nut member and a second nut member through which the screw shaft passes,
   wherein one of the support brackets includes a first support member and a second support member fixed to the lower rail so as to overlap with the lower rail,
   wherein the first support member includes a first fixing portion having a rectangular plate shape which is fixed to the lower rail and a pair of plate-shaped side wall portions formed to stand upright from side ends of the first fixing portion in a lower rail width direction and facing each other with the screw shaft therebetween along the lower rail longitudinal direction, wherein each of the pair of the side wall portions of the first support member has a plate shape extending along the screw shaft, and includes a pair of end surfaces at the front end portion and rear end portion thereof in the lower rail longitudinal direction and a slit whose upper side is opened, in a middle part along the lower rail longitudinal direction of each of the side wall portions, wherein the slit includes a pair of end surfaces on opposing sides in the lower rail longitudinal direction, wherein the first fixing portion is fixed to the lower rail with a pair of rivets in two positions in the lower rail longitudinal direction, wherein the second support member includes, on a side of a one end surface of each of the pair of the side wall portions, a plate-shaped second fixing portion fixed to the lower rail together with the first fixing portion with one of the rivets, and a plate-shaped vertical wall portion orthogonal to a straight line along the lower rail longitudinal direction, the vertical wall portion which comes in contact with the one end surface of each of the pair of the side wall portions of the first support member, and which is provided with a through hole through which the screw shaft passes, wherein the first nut member is disposed in the slit so as to face one of the end surfaces of the slit positioned on the side of the one end surface of each of the pair of the side wall portions, meshes with the screw shaft, and engages with the first support member in a state in which rotation and movement along the lower rail longitudinal direction of the first nut member are regulated, and wherein the second nut member is disposed so as to face the vertical wall portion of the second support member, meshes with the screw shaft, and sandwiches the vertical wall portion and at least a part of each of the pair of the side wall portions between the second nut member and the first nut member.

2. The electric seat slide device according to claim 1, wherein the first nut member is held by the slit, and wherein an other end surface in the lower rail longitudinal direction of each of the pair of the side wall portions of the first support member is formed such that a stopper part provided to the upper rail can abut against the other end surface.

3. The electric seat slide device according to claim 1, wherein in one of the support brackets, the first fixing portion and the second fixing portion are continued with each other, and the first support member and the second support member are formed integrally with each other.

4. The electric seat slide device according to claim 1, wherein the vertical wall portion is disposed so as to face the one end surface of each of the pair of the side wall portions in the lower rail longitudinal direction, and wherein the second nut member is disposed so as to hold the vertical wall portion and the one end surface of each of the pair of the side wall portions between the second nut member and the first nut member such that the vertical wall portion and the one end surface of each of the pair of the side wall portions come in contact with each other.

* * * * *